United States Patent
Tang et al.

(10) Patent No.: US 9,571,260 B2
(45) Date of Patent: Feb. 14, 2017

(54) CHANNEL ESTIMATION METHOD, CHANNEL ESTIMATION APPARATUS AND COMMUNICATION DEVICE FOR CDMA SYSTEMS

(75) Inventors: Zhixun Tang, Beijing (CN); Xie Li, Beijing (CN); Liping Zhang, Beijing (CN)

(73) Assignee: OPTIS CIRCUIT TECHNOLOGY, LLC, Plano, TX (US)

(*) Notice: Subject to any disclaimer, the term of this patent is extended or adjusted under 35 U.S.C. 154(b) by 66 days.

(21) Appl. No.: 14/342,601

(22) PCT Filed: Sep. 14, 2011

(86) PCT No.: PCT/CN2011/079610
§ 371 (c)(1),
(2), (4) Date: Mar. 4, 2014

(87) PCT Pub. No.: WO2013/037107
PCT Pub. Date: Mar. 21, 2013

(65) Prior Publication Data
US 2014/0226600 A1    Aug. 14, 2014

(51) Int. Cl.
*H04L 5/00* (2006.01)
*H04L 25/02* (2006.01)
*H04B 1/7107* (2011.01)

(52) U.S. Cl.
CPC ........... *H04L 5/0073* (2013.01); *H04B 1/7107* (2013.01); *H04L 25/0202* (2013.01);
(Continued)

(58) Field of Classification Search
CPC .. H04L 5/0073; H04L 5/0032; H04L 25/0204; H04L 25/03006; H04L 25/0202; H04B 1/7107; H04B 2201/709745
(Continued)

(56) References Cited

U.S. PATENT DOCUMENTS

| 7,151,948 B2 | 12/2006 | Ishii et al. |
| 2003/0035469 A1* | 2/2003 | Frank ............... H04B 1/71055 375/150 |

(Continued)

FOREIGN PATENT DOCUMENTS

| CN | 1469655 A | 1/2004 |
| CN | 1547328 A | 11/2004 |

(Continued)

*Primary Examiner* — Andrew Chriss
*Assistant Examiner* — Ellen Kirillova
(74) *Attorney, Agent, or Firm* — The Danamraj Law Group, P.C.; Thomas L. Crisman; Kenneth A. McClure

(57) ABSTRACT

The embodiment of the invention discloses a channel estimation method for a TD-SCDMA system. The channel estimation method comprises steps of: obtaining a coarse channel estimation of a channel 1 of an intra-frequency cell set by a single cell channel estimation algorithm; performing an interference cancellation on the coarse channel estimation to obtain a channel estimation; determining a channel environment according to the channel estimation; and determining a stop strategy for the interference cancellation according to the channel environment and controlling performing the interference cancellation according to the stop strategy. The embodiment of the invention also discloses a channel estimation apparatus for a TD-SCDMA system, a communication device and a computer program executing the channel estimation method.

12 Claims, 4 Drawing Sheets

(52) U.S. Cl.
CPC .............. *H04L 25/0204* (2013.01); *H04B 2201/709745* (2013.01)

(58) Field of Classification Search
USPC .......................................... 370/329
See application file for complete search history.

(56) References Cited

U.S. PATENT DOCUMENTS

| | | | |
|---|---|---|---|
| 2003/0058962 | A1 | 3/2003 | Baldwin |
| 2007/0030914 | A1* | 2/2007 | Ding .............. H04L 25/024 375/260 |
| 2010/0002574 | A1* | 1/2010 | Kim .............. H04L 25/0208 370/210 |
| 2010/0029262 | A1* | 2/2010 | Wang .............. H04J 11/004 455/423 |
| 2011/0103500 | A1 | 5/2011 | Vetterli et al. |
| 2013/0070792 | A1 | 3/2013 | Shoaib et al. |

FOREIGN PATENT DOCUMENTS

| | | |
|---|---|---|
| CN | 1572061 A | 1/2005 |
| CN | 101325568 A | 12/2008 |
| CN | 101346955 A | 1/2009 |
| CN | 101494468 A | 7/2009 |
| EP | 1968268 A2 | 10/2008 |
| WO | 2009107071 A2 | 9/2009 |
| WO | 2013037112 A1 | 3/2013 |

\* cited by examiner

CHANNEL ESTIMATION METHOD, CHANNEL ESTIMATION APPARATUS AND COMMUNICATION DEVICE FOR CDMA SYSTEMS

FIELD OF THE INVENTION

This invention relates to mobile communication technology, and more particularly to a channel estimation method, a channel estimation apparatus and a communication device.

BACKGROUND OF THE INVENTION

Even though embodiments of the invention will be described herein in relation to a TD-SCDMA (Time Division-Synchronous Code Division Multiple Access) system, it should be noted that embodiments of the invention may be equally applicable in other scenarios. Thus, the invention is not limited to TD-SCDMA.

A channel in a mobile communication system is typically complex and time-variable. The channel may be estimated and measured at a receiver and then a coherent detection may be performed on a received signal according to a channel estimation (simply referred as "CHE"). Besides in signal detection, the channel estimation may also play a very important role in physical layer measurement, intelligent antenna and radio resource management, and so forth.

FIG. 1 is a schematic diagram showing a structure of a burst signal in a service slot of a TD-SCDMA system. As shown in FIG. 1, in a TD-SCDMA system, a Midamble code in the middle of the burst signal is for channel estimation, which is also referred as a training sequence. Data on both ends of the Midamble code are for transmitting service data. Both the training sequence and the service data are transmitted by a time division method, and slots of different cells are synchronous.

In a TD-SCDMA system, for an intra-frequency network (FRF=1), a conventional channel estimation method mainly includes: obtaining a coarse channel estimation of each cell by a single cell channel estimation algorithm, according to a received Midamble code and basic Midamble codes of every cell; performing an interference cancellation on the coarse channel estimation with iteration; and performing a denoise processing on the channel estimation after the interference cancellation.

In the conventional method, a number of times of iteration is fixed. Since a channel environment of a UE may vary at any given time, the number of times of iteration is usually set to a large value in order to adapt to different channel environments. Therefore, for certain channel environments, if the number of times of iteration is too large, "over-cancellation" may occur, i.e., there may be a case where an interference cancellation is performed on a signal path using a noise path, which leads to inaccurate channel estimation.

Therefore, the conventional channel estimation method needs to be further improved so as to overcome the above weakness.

SUMMARY OF THE INVENTION

According to a first aspect of an embodiment of the invention, a channel estimation method is provided, which may improve an accuracy of channel estimation.

In some embodiments, the method is for a TD-SCDMA system.

The channel estimation method includes steps of: obtaining a coarse channel estimation of each cell of a set of intra-frequency cells by a single cell channel estimation algorithm; performing an interference cancellation on the coarse channel estimation to obtain a channel estimation; determining a channel environment according to the channel estimation; and determining a stop strategy for the interference cancellation according to the channel environment and controlling performing the interference cancellation according to the stop strategy.

In some embodiments, the interference cancellation is an iterative interference cancellation. The step of performing an interference cancellation may comprise first performing at least a first iteration of the interference cancellation. Then the channel environment and the stop strategy may be determined and the interference cancellation may be controlled accordingly. The controlling of the interference cancellation may comprise controlling whether or not (and/or how many) more iterations of the interference cancellation should be performed. Alternatively or additionally, the controlling of the interference cancellation may comprise controlling the number of iterations of the interference cancellation in a subsequent channel estimation.

In some embodiments, the stop strategy includes: stopping performing the interference cancellation, when the channel environment is a static propagation channel; and keeping on performing the interference cancellation, when the channel environment is a multi-path fading channel until a number of times of performing the interference cancellation reaches a first predefined threshold.

In some embodiments, when the channel environment is a multi-path fading channel, the remaining (or total) number of iterations to be performed may be set based on the level of fading of the fading channel (e.g. the number of detected paths, the delay spread, or similar).

In some embodiments, the channel estimation method further includes a step of: performing a denoise processing on a channel estimation obtained after a last interference cancellation.

In some embodiments, during the interference cancellation, maximum power paths used in each iteration are marked, a distribution of signal paths in a channel window is determined, and the channel environment is determined according to the distribution.

In some embodiments, when the channel environment is the static propagation channel, marked paths are all used as signal paths and unmarked paths are all used as noise paths to perform the denoise processing.

In some embodiments, when the channel environment is the multi-path fading channel, a noise power threshold is set according to the power and distribution of the noise paths. In some embodiments, unmarked paths are all used as noise paths when the channel environment is the multi-path fading channel.

According to a second aspect of an embodiment of the invention, a channel estimation apparatus for realizing the channel estimation method according to the first aspect of an embodiment of the invention is provided.

The channel estimation apparatus includes: a coarse channel estimation unit, configured to obtain a coarse channel estimation of each cell of a set of intra-frequency cells by a single cell channel estimation algorithm; an interference cancellation unit, configured to perform an interference cancellation on the coarse channel estimation to obtain a channel estimation; a channel environment determination unit, configured to determine a channel environment according to the channel estimation; and a control unit, configured to determine a stop strategy for the interference cancellation according to the channel environment and to control performing the interference cancellation according to the stop strategy.

In some embodiments, the stop strategy includes: stopping performing the interference cancellation, when the channel environment is a static propagation channel; and keeping on performing the interference cancellation, when the channel environment is a multi-path fading channel until a number of times of performing the interference cancellation reaches a first predefined threshold.

In some embodiments, the channel estimation apparatus further includes a post processing unit, configured to perform a denoise processing on a channel estimation obtained after a last interference cancellation.

In some embodiments, the post processing unit is configured to determine the channel environment by operations of: during the interference cancellation, maximum power paths used in each iteration are marked, a distribution of signal paths in a channel window is determined, and the channel environment is determined according to the distribution.

In some embodiments, when the channel environment is the static propagation channel, the post processing unit is configured to use all marked paths as signal paths and all unmarked paths as noise paths to perform the denoise processing.

In some embodiments, when the channel environment is the multi-path fading channel, the post processing unit is configured to perform the denoise process on the channel estimation result after interference cancellation using a noise power threshold. In some embodiments, use all unmarked paths as noise paths and the noise power threshold is set according to the power and distribution of the noise paths.

According to a third aspect of an embodiment of the invention, a communication device comprising the channel estimation apparatus according to the second aspect of an embodiment of the invention is provided.

According to a fourth aspect of an embodiment of the invention, a computer program comprising machine-executable instructions is provided, wherein when the instructions are executed a processor performs a channel estimation method according to the first aspect of an embodiment of the invention.

Advantages of the second, third and fourth aspects are similar to those of the first aspect of an embodiment of the invention.

DETAILED DESCRIPTION OF THE PREFERRED EMBODIMENTS

In accordance with the channel estimation method and apparatus according to an embodiment of the invention, the channel environment is obtained in real time during the interference cancellation on the coarse channel estimation, and the interference cancellation is controlled adaptively according to different channel environments, so that the number of times of iteration is "matched" with (i.e., corresponds to) the channel environment and "over-cancellation" can be avoided. Therefore, the accuracy of channel estimation may be improved to a certain extent.

Figure 1:
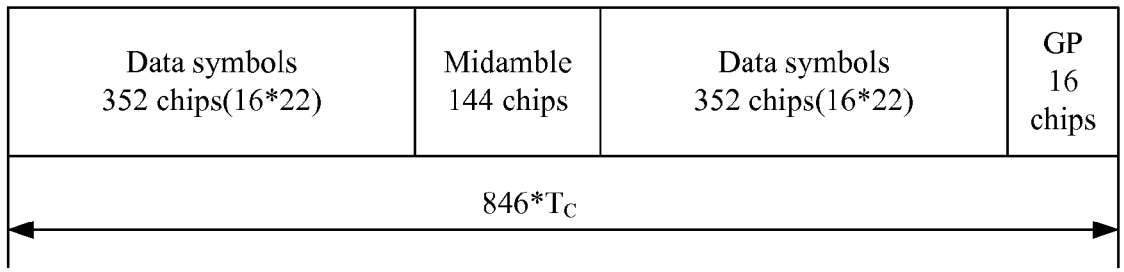
FIG. 1 is a schematic diagram showing a structure of a burst signal in a service slot of a TD-SCDMA system.
Figure 2:
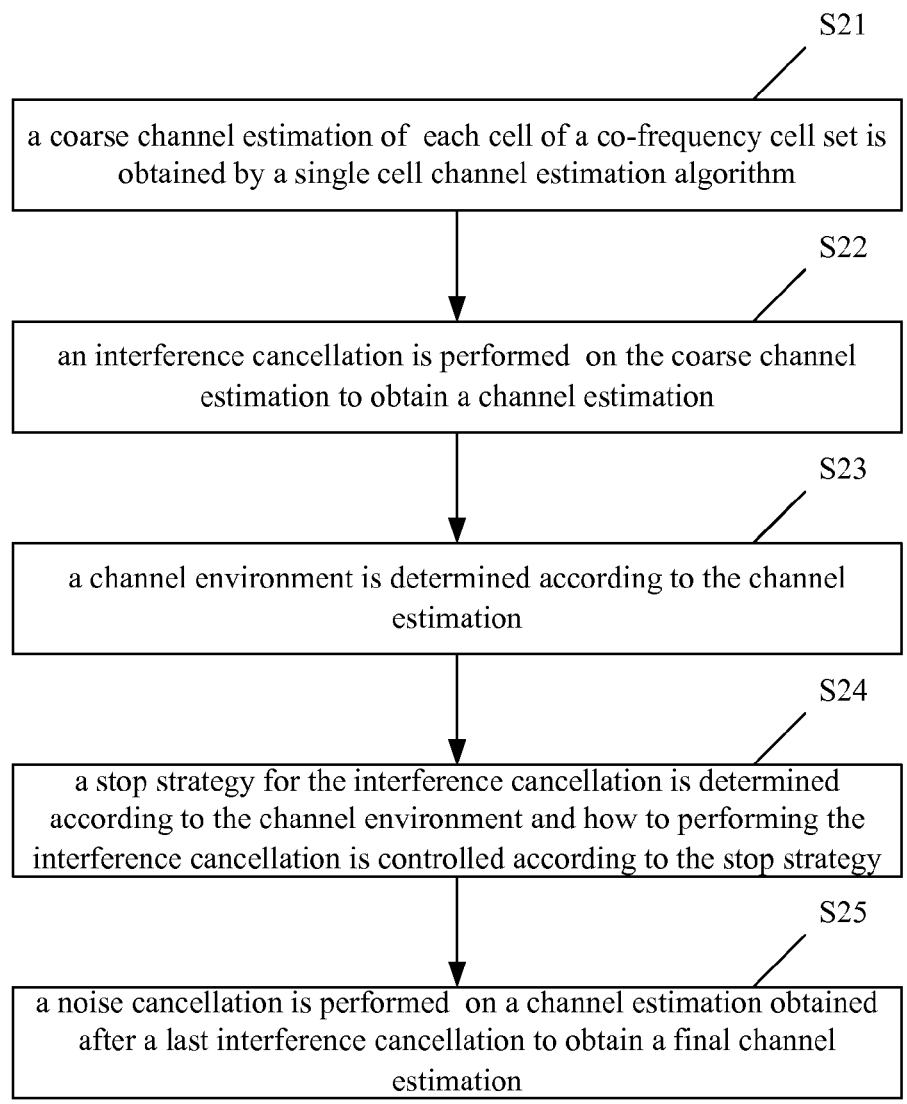
FIG. 2 is a flow chart showing a channel estimation method for a TD-SCDMA system according to an embodiment of the invention.

FIG. 2 is a flow chart showing a channel estimation method for a TD-SCDMA system according to an embodiment of the invention. As shown in FIG. 2, the channel estimation method mainly includes the following steps:

Step S21, a coarse channel estimation of each cell of a set of intra-frequency cells is obtained by a single cell channel estimation algorithm;

Step S22, an interference cancellation is performed on the coarse channel estimation to obtain a channel estimation;

Step S23, a channel environment is determined according to the channel estimation obtained in step S22;

Step S24, a stop strategy for the interference cancellation is determined according to the channel environment and how to perform the interference cancellation is controlled according to the resultant stop strategy; and Step S25, a denoise processing is performed on a channel estimation obtained after a last interference cancellation to obtain a final channel estimation.

Specifically, in step S21, assuming there are cell_num=$N_0$+1 ($N_0$ is an integer equivalent to or larger than 1) intra-frequency cells, including a current cell and a number of neighboring cells thereto. The current cell has a serial number 0, the neighboring cells have serial numbers of 1, 2, . . . , $N_0$, and basic Midamble sequences corresponding to these cells are $M_0, M_1, \ldots, M_{N_0}$ respectively.

The basic Midamble sequence transmitted from the $i^{th}$ cell is: $M_i = (m_{i,1}, m_{i,2}, \ldots, m_{i,128})$, where i=0, 1, . . . , $N_0$.

The Midamble sequence is transmitted as a training sequence together with data information, via a channel. The result received at each receiver is: $RM = (Rm_1, Rm_2, \ldots, Rm_{128})$.

A coarse channel estimation is performed by using Fast Fourier Transform (FFT) and Fast Fourier Inverse Transform (IFFT), and the coarse channel estimation for the $i^{th}$ cell is: $\hat{h}_i = IFFT(FFT(RM_i)./FFT(M_i))$, where i=0, 1, . . . , $N_0$, in which ./ represents a counterpoint division.

In Step S22, the interference cancellation is an iteration process. During its initialization, assuming that:

h_initial$_i$=$\hat{h}_i$, where i=0, 1, . . . , $N_0$;

h_temp$_i$=h_initial$_i$, where i=0, 1, . . . , $N_0$; and

IC_num=0, in which h_initial$_i$ represents a channel estimation after each iteration, h_temp$_i$ is a temporary variable used in the interference cancellation, and IC_num records the number of times of iteration already performed.

The interference cancellation process includes the following steps:

Firstly, the maximum power path (m,n), i.e., the $n^{th}$ path of the $m^{th}$ cell, within the channel estimation h_temp$_i$ obtained after a previous interference cancellation of all cells is obtained.

Then, the following computations are performed so as to cancel an intra-frequency interference with paths of other cells by this maximum power path (m,n):

h_initial$_i$=h_initial$_i$−$I_i$, where i≠m h_temp$_i$=h_temp$_i$−$I_i$, where i≠m.

In the above equation, $I_i$ represents an interference vector to the $i^{th}$ cell by this maximum power path (m,n), and this interference vector may be obtained by:

$CR^{(i,j)}$=IFFT(FFT($M_j$)./FFT($M_i$)), where i, j=0, 1, ..., $N_0$;

$(I_i)_j$=$h_{m,n}$×$(CR^{(i,m)})_{(j-n+128) mod 128}$, where i≠m, j=0, 1, ..., 127.

In the above equation, $CR^{(i,j)}$ represents an interference vector to cell i by cell j. $(I_i)_j$ is the $j^{th}$ element of vector $I_i$, representing an intra-frequency interference with the $j^{th}$ path of the $i^{th}$ cell by the $n^{th}$ path of the $m^{th}$ cell, and $h_{m,n}$ represents a channel impulse response value of the $n^{th}$ path of the $m^{th}$ cell.

In addition, after each interference cancellation, the following updates are also to be performed:

(h_temp$_m$)$_n$=0

IC_num=IC_num+1.

After the above updates, it may be determined whether IC_num reaches a predefined threshold of times of iteration. If yes, the channel estimation obtained after the interference cancellation is output directly, without executing the following steps; otherwise, it proceeds to step S23. Herein, the predefined threshold of times of iteration may be set to 40~60.

In step S23, it may be determined whether the channel environment may be determined according to the channel estimation obtained after the interference cancellation in step S22. The specific procedure is as follows:

after each interference cancellation, a maximum power path of all cells is found according to the current channel estimation h_temp$_i$ and its position is marked as (m,n), i.e., the $n^{th}$ path of the $m^{th}$ cell;

a power value $P_{max}$ of the $n^{th}$ path of the $m^{th}$ cell is obtained;

a power value $P_{Scell}$ of the maximum power path within the current channel estimation h_initial$_0$ of the current cell is obtained;

if $P_{Max}/P_{Scell}$<thrsh_pow, then the channel environment needs to be determined; otherwise, it returns to step S22 and a next interference cancellation is performed. thrsh_pow is a predefined threshold value of power ratio and may be set to, for example, 8~12.

When it is determined that the channel environment needs to be determined, the following steps are performed:

a number of channel windows including at least one marked path Win_total is obtained;

a number of channel windows Win_case is obtained from the Win_total channel windows, where the number of the marked paths in each of the Win_case channel windows is larger than x and x may be 1 or 2;

if Win_case/Win_total>thrsh_num, then it is determined that the channel environment is a multi-path fading channel; otherwise, it is determined that the channel environment is a static propagation channel. Here, the thrsh_num may be set to 0.4~0.6.

In step S24, the stop strategy determined for the interference cancellation includes:

stopping performing the interference cancellation, when the channel environment is a static propagation channel; and keeping on performing the interference cancellation, when the channel environment is a multi-path fading channel until a number of times of performing the interference cancellation reaches a predefined times of iteration threshold.

Step S25 is an optional step. After stopping the interference cancellation according to the stop strategy, step S25 may be chosen to be performed or not to be performed depending on specific requirements.

In Step 25, a noise power estimation may be performed on the channel estimation, a noise power threshold may be set according to the noise power estimation. Then, channel impulse response values of paths whose power values are less than the noise power threshold within the channel estimation obtained after the last interference cancellation are set to zero, thereby a channel estimation after the denoise processing can be obtained.

In some embodiments, the noise power estimation and noise power threshold setting may be performed according to the following steps:

for each cell, taking unmarked paths within the channel estimation obtained after the last interference cancellation as noise paths and obtaining a noise power of the each cell according to a power of the noise paths; and averaging noise powers of all cells and obtaining a noise power threshold.

In step S25, different denoise processing methods may be used according to different channel environments.

For example, when the channel environment is a static propagation channel, a simplified denoise processing may be adopted, in which marked paths obtained after the last interference cancellation are all used as signal paths, while unmarked paths obtained after the last interference cancellation are all used as noise paths, channel impulse response values of all unmarked paths are set to zero so as to finish the denoise processing on the channel estimation. According to this denoise processing method, for signal paths, since the channel is determined as approximate single-path channel, x signal paths with the maximum power are retained at most in number within each signal window.

When the channel environment is a multi-path fading channel, the following denoise processing method may be adopted, which includes the following steps:

marked paths after the last interference cancellation are all used as signal paths, while unmarked paths after the last interference cancellation are all used as noise paths;

assuming in the $i^{th}$ cell, the number of the signal paths is signal_path$_i$, then the number of the noise paths is noise_path$_i$=128−signal_path$_i$;

a sum of power Pow_noise_path$_i$ of noise_path, noise paths in the $i^{th}$ cell is calculated and then is extended to 128 points so that the noise power of the $i^{th}$ cell may be calculated as: $\sigma_{ISCPi}$=Pow_noise_path$_i$/nosie_path$_i$×128;

the noise powers of cell_num cells are averaged and the noise power is obtained as:

$$\sigma_{ISCP} = \frac{1}{\text{cell\_num}} \sum_{i=0}^{cell\_num-1} \sigma_{ISCPi};$$

and

At last, channel impulse response values of paths whose power values are less than the noise power threshold $\sigma_{ISCP}$ within the channel estimation obtained after the last interference cancellation are set to zero, thereby a channel estimation after the denoise processing can be obtained.

According to an embodiment of the invention, a channel estimation apparatus realizing the above channel estimation method is also provided.

Figure 3:
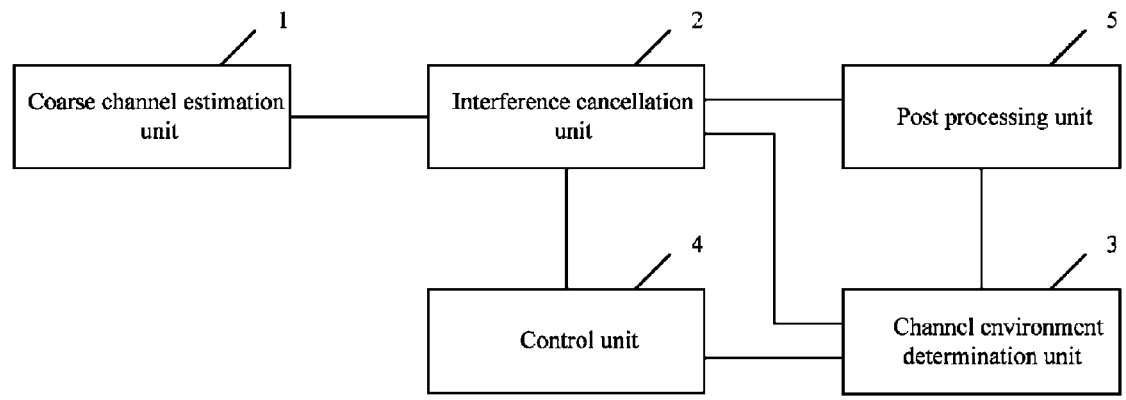
FIG. 3 is a schematic diagram showing a structure of a channel estimation apparatus for a TD-SCDMA system according to an embodiment of the invention.
Figure 4A:
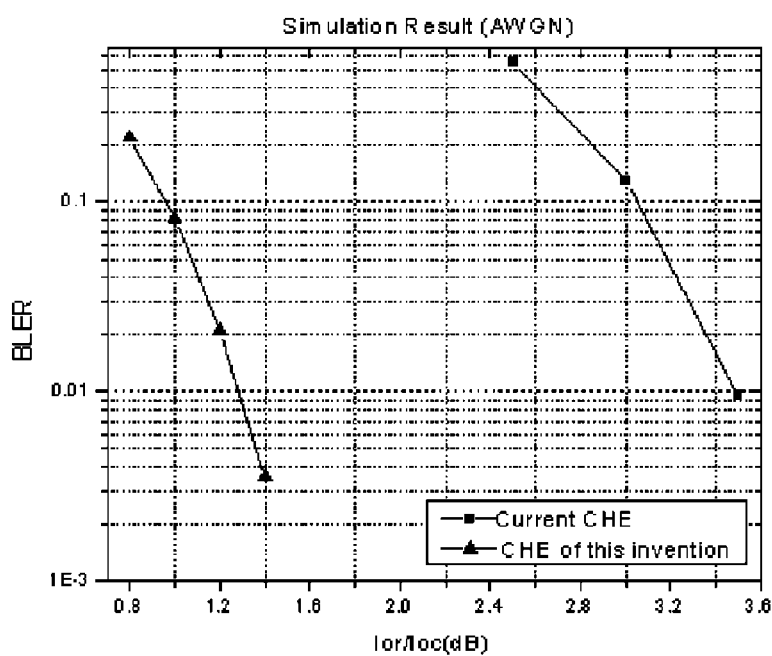
FIGS. 4*a*~4*d* are schematic diagrams showing a comparison between a channel estimation method according to an embodiment of the invention and a conventional channel estimation method.
Figure 4B:
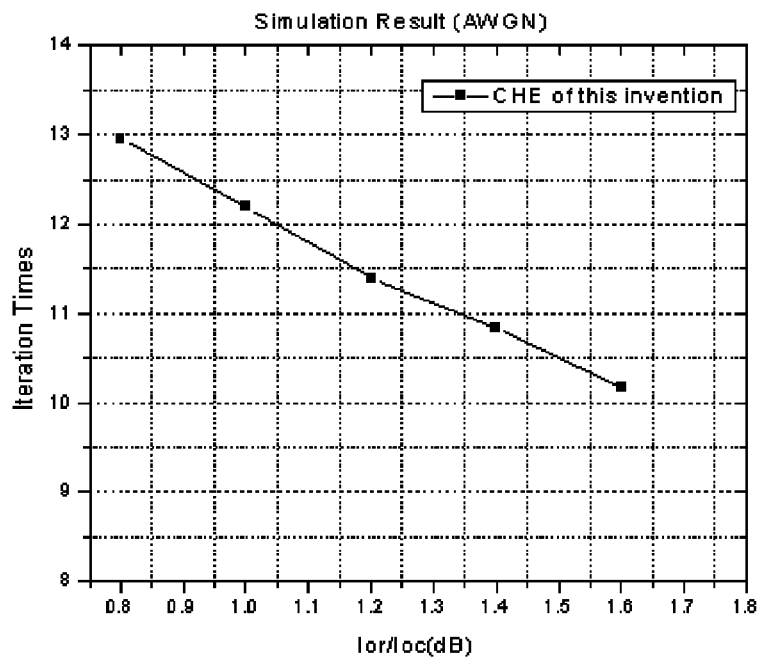
Figure 4C:
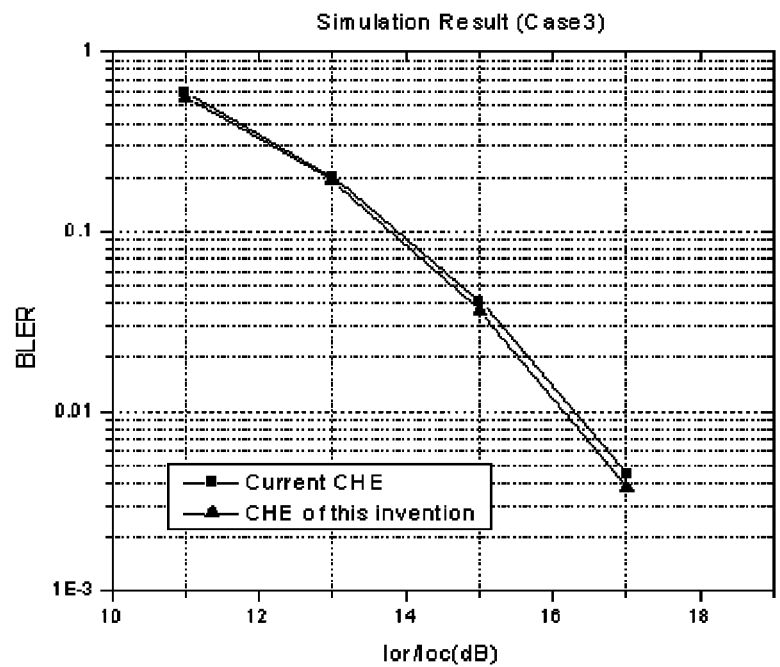
Figure 4D:
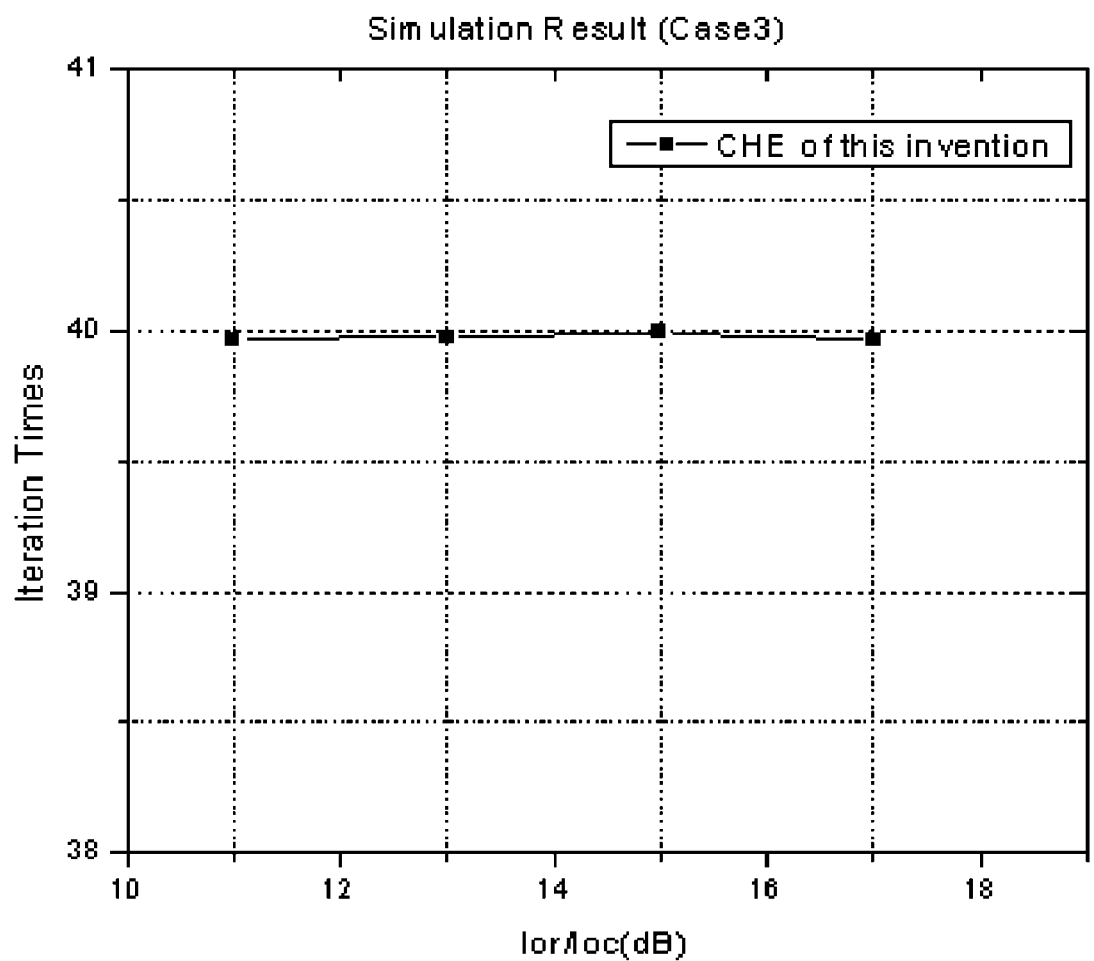

FIG. 3 is a schematic diagram showing a structure of a channel estimation apparatus for a TD-SCDMA system according to an embodiment of the invention. As shown in FIG. 3, the channel estimation apparatus mainly includes a coarse channel estimation unit 1, an interference cancellation unit 2, a channel environment determination unit 3, a control unit 4 and a post processing unit 5.

The coarse channel estimation unit 1 is configured to perform the above step S21; the interference cancellation unit 2 is configured to perform the above step S22; the channel environment determination unit 3 is configured to perform the above step S23; the control unit 4 is configured to perform the above step S24; and the post processing unit 5 is configured to perform the above step S25, respectively.

The post processing unit 5 is an optional unit, and its presence or absence may be set according to specific requirements.

According to the channel estimation method and apparatus of the embodiment of the invention, the current channel environment may be coarsely estimated so that different iteration stop strategy for the interference cancellation and different denoise processing methods may be adopted adaptively. Therefore, the accuracy of channel estimation may be improved effectively and the complexity of the algorithm in estimating the channel may be reduced in an average sense.

In addition, according to the channel estimation method and apparatus of the embodiment of the invention, when actual intra-frequency interference cells are less than the configured intra-frequency interference cells, mis-detection may be corrected to some extent and the performance of a receiver may be improved.

The following tables show simulation results of the TD-SCDMA system, which verify advantages of the channel estimation method and apparatus of the embodiment of the invention. Specific simulation parameters come from 3GPP 25.102 and some important simulation parameters only be listed as follows.

TABLE 1

| Communication system | TD-SCDMA |
|---|---|
| Number of cells | 3 |
| Midamble code | {19, 58, 85} |
| Modulation | QPSK |
| Number of transmitting antenna | 1 |
| Number of receiving antenna | 1 |
| Spreading factor | 16 |
| Kcell | 8 |
| Number of slots | 1 |
| Useful signal code channel number | 1, 2, 3, 4, 5, 6, 7, 8 |
| Signal code channel number of interference cell 1 | 1, 2, 3, 4, 5, 6 |
| Signal code channel number of interference cell 2 | 1, 2, 3, 4, 5, 6 |
| Ratio of single code channel power of interference cell 1 to noise power | 10 dB |
| Ratio of single code channel power of interference cell 2 to noise power | 4 dB |
| Noise power | −90 dBm |
| Channel environment | AWGN, Case3 |

In Table 1, Kcell represents the number of channel windows in a cell. Based on the above simulation configurations and channel environments, the simulation results are shown in FIG. 4. FIG. 4 shows according to the channel estimation algorithm of the embodiment of the invention, in the AWGN channel, 2 dB gain may be obtained, the number of times of iteration of interference cancellation is reduced from 40 to about 12; and in the simulation fading Case 3 channel, the same performance and number of times of iteration of interference cancellation as some conventional algorithms may be obtained.

Then the complexity of the channel estimation algorithm according to the embodiment of the invention is compared with that of a conventional channel estimation algorithm and shown in Table 2. As shown in Table 2, assuming the number of times of intra-frequency interference cancellation is 40 in the conventional channel estimation algorithm, then the number of times of intra-frequency interference cancellation in the channel estimation algorithm according to the embodiment of the invention is K (K≤40).

TABLE 2

| Main steps | Conventional channel estimation | | Adaptive channel estimation | |
|---|---|---|---|---|
| | Multiplication (complex number) | Comparison (complex number) | Multiplication (complex number) | Comparison (complex number) |
| Coarse channel estimation | same | | | |
| Interference vector calculation | same | | | |
| Interference Iterative cancellation | 15360 | 20480 | 384K | 512 K |
| Channel condition determination | None | None | K + 1 | ≤64 K |
| Channel post processing selection | None | None | 0 | 1 |
| Channel post processing (noise calculation) | 512 | 25216 | 512-K | 0 |
| Channel post processing (denoise processing) | 0 | 512 | 0 | 0 |

Table 2 shows that the adaptive channel estimation algorithm according to the embodiment of the invention is much less complicated than the conventional channel estimation algorithm.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A channel estimation method performed using a channel estimation apparatus, the method comprising:
    obtaining a first channel estimation of each cell of a set of intra-frequency cells by a channel estimation algorithm using information from one cell;
    performing an interference cancellation on the first channel estimation for at least one cell of the intra-frequency cells to obtain a second channel estimation for the at least one cell, wherein each second channel estimation is more accurate than the corresponding first channel estimation;
    determining a channel environment for the at least one cell according to the second channel estimation;
    determining a stop strategy for the interference cancellation according to the channel environment; and
    controlling the performing of the interference cancellation according to the stop strategy wherein controlling the performance of the interference cancellation according to the stop strategy comprises:
        stopping performing of the interference cancellation for the at least one cell when the channel environment comprises a static propagation channel; and
        keeping on performing the interference cancellation for the at least one cell when the channel environment comprises a multi-path fading channel until a number of times the interference cancellation is performed for the at least one cell reaches a first predefined threshold.

2. The channel estimation method according to claim 1, further comprising performing a denoise processing on the second channel estimation obtained after a last interference cancellation is performed for the at least one cell.

3. The channel estimation method according to claim 2, wherein determining the channel environment according to the second channel estimation further comprises:
  determining a first maximum power path of the set of intra-frequency cells after each interference cancellation is performed, and marking each first maximum power path;
  determining a second maximum power path of a current cell, after each interference cancellation is performed, according to the second channel estimation obtained after the corresponding interference cancellation is performed;
  in response to a ratio of a first power value of the first maximum power path to a second power value of the second maximum power path for a particular performance of the interference cancellation being less than a second predefined threshold associated with the same particular performance of the interference cancellation, obtaining a first sum and a second sum, wherein the first sum represents a first number of channel windows including at least one of the marked first maximum power paths and the second sum represents a second number of channel windows including the marked first maximum paths whose number is larger than a third predefined threshold; and
  in response to a ratio of the second sum to the first sum being larger than a fourth predefined threshold, determining the channel environment comprises the multi-path fading channel, and otherwise determining the channel environment comprises the static propagation channel.

4. The channel estimation method according to claim 3, wherein in response to the channel environment comprising the static propagation channel, the performing of the denoise processing on the second channel estimation obtained after the last interference cancellation is performed for the at least one cell further comprises setting channel impulse response values of unmarked paths within the second channel estimation obtained after the last interference cancellation to zero.

5. The channel estimation method according to claim 3, wherein in response to the channel environment comprising the multi-path fading channel, the performing of the denoise processing on the second channel estimation obtained after the last interference cancellation is performed for the at least one cell further comprises:
  for each cell, taking unmarked paths within the corresponding second channel estimation obtained after the last interference cancellation as noise paths and obtaining a noise power of each cell according to a power of the noise paths;
  averaging the noise powers obtained for each cell and obtaining a noise power threshold; and
  setting channel impulse response values of paths within the second channel estimation obtained after the last interference cancellation to zero, wherein power values of the paths within the second channel estimation obtained after the last interference cancellation are less than the noise power threshold.

6. A channel estimation apparatus, comprising:
  a first channel estimation circuit configured to obtain a first channel estimation of each cell of a set of intra-frequency cells by a channel estimation algorithm using information from one cell;
  an interference cancellation circuit configured to perform an interference cancellation on the first channel estimation for at least one cell of the intra-frequency cells to obtain a second channel estimation for the at least one cell;
  a channel environment determination circuit configured to determine for the at least one cell a channel environment according to the second channel estimation; and
  a control circuit, configured to determine a stop strategy for the interference cancellation according to the channel environment and to control the performing of the interference cancellation according to the stop strategy by:
    stopping performing of the interference cancellation for the at least one cell when the channel environment comprises a static propagation channel; and
    keeping on performing the interference cancellation for the at least one cell when the channel environment comprises a multi-path fading channel until a number of times the interference cancellation is performed for the at least one cell reaches a first predefined threshold.

7. The channel estimation apparatus according to claim 6, further comprising a post processing circuit configured to perform a denoise processing on the second channel estimation obtained after a last interference cancellation is performed for the at least one cell.

8. The channel estimation apparatus according to claim 7, wherein the channel environment determination circuit is configured to determine the channel environment by:
  determining a first maximum power path of the set of intra-frequency cells after each interference cancellation is performed, and marking each first maximum power path;
  determining a second maximum power path of a current cell, after each interference cancellation is performed, according to the second channel estimation obtained after the each interference cancellation;
  in response to ratio of a first power value of the first maximum power path to a second power value of the second maximum power path for a particular performance of the interference cancellation being less than a second predefined threshold associated with the same particular performance of the interference cancellation, obtaining a first sum and a second sum, wherein the first sum represents a first number of channel windows including at least one of the marked first maximum power paths and the second sum represents a second number of channel windows including the marked first maximum paths whose number is larger than a third predefined threshold; and
  in response to a ratio of the second sum to the first sum being larger than a fourth predefined threshold, determining the channel environment comprises the multi-path fading channel, otherwise determining the channel environment comprises the static propagation channel.

9. The channel estimation apparatus according to claim 8, wherein in response to the channel environment comprising the static propagation channel, the post processing circuit is configured to perform the denoise processing on the second channel estimation obtained after the last interference cancellation is performed for the at least one cell by setting channel impulse response values of unmarked paths within the second channel estimation obtained after the last interference cancellation to zero.

10. The channel estimation apparatus according to claim 8, wherein in response to the channel environment comprising the multi-path fading channel, the post processing circuit is configured to perform the denoise processing on the second channel estimation obtained after the last interference cancellation is performed for the at least one cell by:
    for each cell, taking unmarked paths within the corresponding second channel estimation obtained after the last interference cancellation as noise paths and obtaining a noise power of each cell according to a power of the noise paths;
    averaging the noise powers obtained for each cell and obtaining a noise power threshold; and
    setting channel impulse response values of paths within the second channel estimation obtained after the last interference cancellation to zero, wherein power values of the paths within the second channel estimation obtained after the last interference cancellation are less than the noise power threshold.

11. The channel estimation apparatus according to claim 6, wherein the channel estimation apparatus is disposed in a communication device.

12. A computer program product comprising non-transitory computer readable medium storing machine-executable instructions for controlling channel estimation apparatus, wherein the machine-executable instructions, when executed on one or more circuits in the channel estimation apparatus, cause the channel estimation apparatus to:
    obtain a first channel estimation of each cell of a set of intra-frequency cells by a channel estimation algorithm using information from one cell;
    perform an interference cancellation on the first channel estimation for at least one cell of the intra-frequency cells to obtain a second channel estimation for the at least one cell;
    determine a channel environment for the at least one cell according to the second channel estimation;
    determine a stop strategy for the interference cancellation according to the channel environment; and
    control the performing of the interference cancellation according to the stop strategy by:
        stopping performing of the interference cancellation for the at least one cell when the channel environment comprises a static propagation channel; and
        keeping on performing the interference cancellation for the at least one cell when the channel environment comprises a multi-path fading channel until a number of times the interference cancellation is performed for the at least one cell reaches a first predefined threshold.

* * * * *